United States Patent [19]

Kurokawa

[11] Patent Number: 4,778,185
[45] Date of Patent: Oct. 18, 1988

[54] WOOD-TYPE CORE-SHELL GOLF CLUB HEADS

[75] Inventor: Ikuji Kurokawa, Hamamatsu, Japan

[73] Assignee: Yamaha Corporation, Japan

[21] Appl. No.: 98,491

[22] Filed: Sep. 18, 1987

Related U.S. Application Data

[63] Continuation-in-part of Ser. No. 709,439, Mar. 8, 1985, abandoned.

[30] Foreign Application Priority Data

Mar. 13, 1984 [JP] Japan ................................. 59-24636

[51] Int. Cl.$^4$ .............................................. A63B 53/04
[52] U.S. Cl. ................................ 273/167 H; 273/169
[58] Field of Search ........... 273/167 D, 167 J, 167 H, 273/167 R, 167 F, 173, 174, 67 A, 72 R, 78, DIG. 7, DIG. 23

[56] References Cited

U.S. PATENT DOCUMENTS 3,598,693  8/1971  Anderson et al. .......... 273/DIG. 32

FOREIGN PATENT DOCUMENTS 2115295  9/1983  United Kingdom ............ 273/167 H

Primary Examiner—George J. Marlo
Attorney, Agent, or Firm—Sachs & Sachs

[57] ABSTRACT

A wood-type core-shell golf club head includes a core of foamable synthetic resin with a shell of short and long fiber reinforced plastic having improved shock transmission and an ideal hard touch at impact of the head with a golf ball.

The shell includes in its face side section a homogeneous mixture of a resin matrix, and a fiber mixture of long reinforcement fibers having a length of from 12.5 to 50 mm, and short reinforcement fibers having a length of 3 mm or less, the content ratio of said long ad short fibers ranging from 90 to 70% by weight of said long fibers to 10 to 30% by weight of said short fibers, the content ratio of said mixture of fibers to said resin matrix ranging from 40 to 60% by weight of said fibers to 60 to 40% by weight of said resin matrix, the said face side section structure providing a club head which effectively transmits and reduces absorption of shock at impact of the club head with a golf ball.

3 Claims, 1 Drawing Sheet

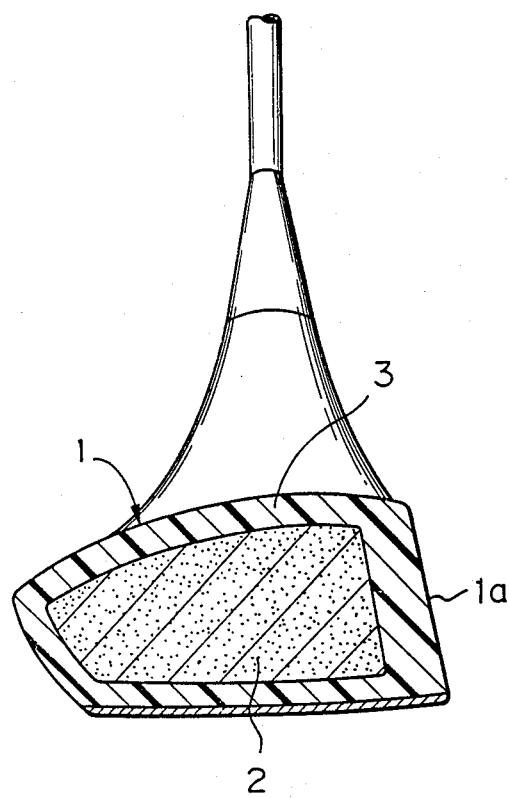

WOOD-TYPE CORE-SHELL GOLF CLUB HEADS

This invention is a continuation-in-part of previously filed application Ser. No. 709,439, filed Mar. 8, 1985, now abandoned.

BACKGROUND OF THE INVENTION

1. Field of the Invention

This invention relates to an improved wood-type core-shell golf club head, and, more particularly, to a unique structure which effectively transmits and reduces absorption of shock at impact of the club head with a golf ball.

2. Description of the Relevant Art

Wood-type core-shell golf club heads are disclosed in Japanese Utility Model Publication Sho. No. 50-113559, which shows a face side of the club head made of carbon fiber reinforced plastic (FRP) cloth. Another such wood-type FRP golf club head is disclosed in Japanese Patent Publication Sho. No. 57-203461, in which the entire shell of the club head is reinforced with short carbon fibers. Anderson, in U.S. Pat. No. 3,598,693 in a molding composition, utilizes short fibers in a substantially parallel arrangement to increase hardness. Hayashi, in Great Britain Patent No. 2,115,293, provides a golf club head using only short fibers impregnated in a synthetic resin. Monget, in Great Britain Patent No. 2,103,667 teaches the incorporation of intertwined filaments to brace a thermoplastic resin tube or beam.

However, none of these references provide a homogeneous mixture of fibers of predetermined composition and length, in a selected weight ratio of each, in a wood type core-shell golf club head, to effectively transmit and reduce absorption of shock at impact. In particular, the poor uniformity of the fibers of the prior art, tend to generate fine cracks in the shell during transmission of shot impulse from the face side due to microscopic unevenness in elasticity and strength. In addition, the interspersion, diffusion and interference of elastic waves during such transmission are caused by shock absorption of resin particles which fill the spaces between the long fibers, leading to poor user feeling at impact.

Accordingly, the object of the invention is to provide an improved wood-type core-shell golf club head structure which displays enhanced strength and feeling at impact of the golf head with the golf ball.

Another object of the present invention is to provide a microscopically uniform homogeneous mixture of reinforcement fibers in a club head core-shell construction, which effectively transmits and reduces absorption of sock at impact.

SUMMARY OF THE INVENTION

What is provided herein is an improved wood-type core-shell golf club head which utilizes a homogeneous mixture of (1) an epoxy of vinyl resin matrix and (2) a fiber mixture comprising (a) long reinforcement fibers of predetermined composition and length, and (b) short reinforcement fibers of selected composition and length, within a predetermined weight ratio, in the FRP shell section, in its face side section, to effectively transmit and reduce absorption of shock at impact of the club head with a golf ball.

In the preferred embodiment of the invention, the fiber mixture comprises long reinforcement fibers selected from carbon fibers or carbon fibers admixed with glass fibers, having a length of from 12.5 to 50 mm., and short reinforcement fibers selected from boron carbide, a lumina, carbon, glass or silicon carbide, having a length of 3 mm. or less, the content ratio of the long and short fibers ranges from 90 to 70%, to 10 to 30% by weight, respectively.

BRIEF DESCRIPTION OF THE DRAWING

The sole FIGURE is a side view, partly in section, of a golf club head in accordance with the present invention.

DESCRIPTION OF THE PREFERRED EMBODIMENT

In the attached drawing, a wood-type FRP golf club head 1 includes a core 2 made of, for example, a foamable synthetic resin, and a shell 3 wholly embracing core 2. Shell 3 includes, at least in its face side section, a mixture of long and short fibers, of predetermined lengths and compositions, within a resin matrix, such as an epoxy or vinyl ester resin matrix suitably, the long reinforcement fibers, such as carbon fibers or carbon fibers admixed with glass fibers, and the short fibers, such as made of boron carbide, alumina, carbon, glass or silicon carbide, form a homogeneous mixture with the resin matrix.

Preferably, the length of the long fibers is within a range from 12.5 to 5 mm., and more preferably, from 12.5 to 25 mm., while the length of the short fibers if 3 mm. or less. Preferably, the content ratio of the long and short fibers is from 90 to 70% by weight of the long fibers, to from 10 to 30% by weight of the short fibers. Preferably, the content ratio of the mixture of fibers and the resin matrix is from 40 to 60% by weight of fibers to from 60 to 40% by weight of resin.

The mixture of long and short fibers of the invention may be included either directly in the face side section of shell 3 or in the form of an insert in the face side section of shell 3.

The invention will be illustrated by reference to the following example.

EXAMPLE

A golf club, which includes a wood-type core-shell club head is constructed using a shell in its face side section made of a homogeneous mixture of an epoxy resin matrix and a fiber mixture of long fibers having a length of 15 mm., and short fibers having a length of 2 mm., both fibers being made of carbon, with a weight ratio of 80:20 long: short fibers; and in a 50:50 weight ratio with the epoxy resin. In actual use, it is observed that such golf club effectively promotes shock transmission and reduces shock absorption when striking the golf ball, and displays an enriched, hard touch at shot.

What is claimed is:

1. In a wood-type core-shell golf club head wherein the core is made of a foamable synthetic resin and the shell is a fiber reinforced plastic, the improvement which is characterized in that the shell includes in its face side section a homogeneous mixture of a resin matrix, and a fiber mixture of long reinforcement fibers having a length of from 12.5 to 50 mm., and short reinforcement fibers having a length of 3 mm. or less, the content ratio of said long and short fibers ranging from 90 to 70% by weight of said long fibers to 10 to 30% by weight of said short fibers, the content ratio of said mixture of fibers to said resin matrix ranging from 40 to 60% by weight of said fibers to 60 to 40% by weight of said resin matrix, the said face side section structure providing a club head which effectively transmits and reduces absorption of shock at impact of the club head with a golf ball.

2. A wood-type core-shell golf club head according to claim 1 wherein said resin matrix is an epoxy or vinyl resin, said long fibers are carbon or carbon fibers admixed with glass fibers, and said short fibers are boron carbide, alumina, carbon, glass or silicon carbide fibers.

3. A wood-type core-shell golf club head according to claim 2 wherein said long fibers have a length of about 15 mm., said short length fibers have a length of about 2 mm., within a weight ratio of 80:20 weight ratio of each, and in a 50:50 weight ratio of said mixture of fibers to the resin matrix.

* * * * *